US012021830B2

(12) United States Patent
Nishiguchi et al.

(10) Patent No.: US 12,021,830 B2
(45) Date of Patent: Jun. 25, 2024

(54) COMMUNICATION CONTROL DEVICE, COMMUNICATION CONTROL METHOD, AND COMMUNICATION CONTROL PROGRAM

(71) Applicant: Nippon Telegraph and Telephone Corporation, Tokyo (JP)

(72) Inventors: Masato Nishiguchi, Musashino (JP); Satoshi Nakatsukasa, Musashino (JP); Takahiro Shibata, Musashino (JP); Toshiyuki Kanazawa, Musashino (JP); Hiroki Iwahashi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/275,876

(22) PCT Filed: Feb. 16, 2021

(86) PCT No.: PCT/JP2021/005728
§ 371 (c)(1),
(2) Date: Aug. 4, 2023

(87) PCT Pub. No.: WO2022/176020
PCT Pub. Date: Aug. 25, 2022

(65) Prior Publication Data
US 2024/0163247 A1    May 16, 2024

(51) Int. Cl.
*H04L 61/5014* (2022.01)
*H04L 61/5053* (2022.01)

(52) U.S. Cl.
CPC ...... *H04L 61/5014* (2022.05); *H04L 61/5053* (2022.05)

(58) Field of Classification Search
None
See application file for complete search history.

(56) References Cited

U.S. PATENT DOCUMENTS

| 6,393,484 B1* | 5/2002 | Massarani | H04L 61/35 709/227 |
| 11,750,559 B2* | 9/2023 | Nakatsukasa | H04L 61/5053 709/245 |
| 2017/0078927 A1* | 3/2017 | Hahn | H04W 36/0033 |
| 2022/0394011 A1* | 12/2022 | Nakatsukasa | H04L 61/5014 |

FOREIGN PATENT DOCUMENTS

JP    201717631    1/2017

OTHER PUBLICATIONS

NTT.com [online], "Introduction of uRPF," available on or before Jan. 1, 2021, retrieved on Feb. 3, 2021, retrieved from URL<https://www.ntt.com/business/services/network/internet-connect/ocn-business/bocn/gijyutsu/urpf.html>, 5 pages (with machine translation).

* cited by examiner

*Primary Examiner* — Quang N Nguyen
(74) *Attorney, Agent, or Firm* — Fish & Richardson P.C.

(57) ABSTRACT

An edge control device includes: an acquisition unit configured to acquire information about switching of an edge router accommodating a user's terminal; an instruction unit configured to instruct a dynamic host configuration protocol (DHCP) server to induce re-acquisition of an internet protocol (IP) address by the user's terminal on the basis of the information about edge router switching acquired by the acquisition unit; and a receiving unit configured to receive, from a DHCP server, a notification that induction of IP address reacquisition is completed.

9 Claims, 7 Drawing Sheets

COMMUNICATION CONTROL DEVICE, COMMUNICATION CONTROL METHOD, AND COMMUNICATION CONTROL PROGRAM

CROSS-REFERENCE TO RELATED APPLICATIONS

This application is a National Stage application under 35 U.S.C. § 371 of International Application No. PCT/JP2021/005728, having an International Filing Date of Feb. 16, 2021.

The disclosure of the prior application is considered part of the disclosure of this application, and is incorporated by reference in its entirety into this application.

TECHNICAL FIELD

The present invention relates to a communication control device, a communication control method, and a communication control program.

BACKGROUND ART

In a carrier network, there is a switchover of an edge router in which a user's terminal ("user terminal" or "terminal" as appropriate) ("maintenance and accommodation change" as appropriate) is accommodated which is performed for the purpose of maintenance at the carrier's convenience. When switching edge routers, after deleting the setting information of the currently accommodated user (as appropriate, "user configuration") from the switching source edge router (as appropriate, the "switching source edge router"), the same information is input to the switching destination edge router (as appropriate, "switching destination edge router"). Unicast reverse path forwarding (uRPF) may be applied to edge routers in carrier networks for security purposes in some cases and application of the uRPF is recommended from the Internet engineering task force (IETF) which is a standardization body for Internet-related techniques (for example, refer to NPL 1).

A maintenance and accommodation change in the related art is described with reference to FIG. 6. FIG. 6 is a diagram for explaining maintenance and accommodation change of an edge router in the related art. First, an edge control device 110 deletes setting information 22 (22A, 22B, 22C, 22D) corresponding to user terminals 30 (30A, 30B, 30C, 30D) from a switching source edge router 20A. Subsequently, the edge control device 110 inputs setting information 23 (23A, 23B, 23C, 23D) which is the same information as the setting information 22 to a switching destination edge router 20B. Here, the user setting information (user configuration) is information including transfer settings for each user, and is information about, for example, an internet protocol (IP) address, a virtual local area network (VLAN), and an access control list (ACL): access control list).

CITATION LIST

Non Patent Literature

[NPL 1] NTT Communications, "Introduction of uRPF", [online], [retrieved Feb. 3, 2021], Internet <https://www.n-tt.com/business/services/networkanternet-connect/ocn-business/bocn/gijyutsu/urpf.html>

SUMMARY OF INVENTION

Technical Problem

However, with the above-described technique in the related art, service impact on user communications may occur in maintenance and accommodation change of edge routers in carrier networks in some cases. This is because, in a technique in the related art, in addition to being unable to detect the switching of the destination edge on the terminal side, uRPF applied to the edge router causes a communication interruption until a dynamic host configuration protocol (DHCP) lease timer of the terminal is exceeded. Normally, when the input of the user configuration is completed, user communication is blocked by uRPF until the DHCP binding table in the edge router is updated, even though the IP reachability between the switching destination and the terminal is secured.

The flow of maintenance and accommodation change in the related art is described with reference to FIG. 7. FIG. 7 is a sequence diagram for explaining maintenance and accommodation change of an edge router in the related art. First, a user terminal 30 transmits a dynamic host configuration protocol version 6 (DHCPv6) request or a DHCPv6 request to a DHCP server 40 (Step S201). On the other hand, the DHCP server 40 transmits DHCPv6 advertisements and DHCPv6 responses to the user terminal 30 (Step S201). At this time, a switching source edge router 20A relays a DHCP packet between the user terminal 30 and the DHCP server 40. As a result, an IP address is issued from the DHCP server 40 to the user terminal 30 and a lease timer indicating an effective time of the address is activated (Step S202).

Subsequently, when maintenance and accommodation change is started (Step S203), the edge control device 110 deletes the user configuration of the switching source edge router 20A (Step S204) and sets the user configuration of the switching destination edge router 20B (Step S205). Note that the reason why the edge control device 110 needs to delete the user configuration of the switching source edge router 20A is that, if the user configuration is duplicated in multiple edge routers, multicast duplicate distribution and DHCP relay of multiple edges will occur.

Also, after a lease timer (T1) has expired, the user terminal 30 relays the edge router 20 and transmits a DHCP update (Steps S206 and S207). At this time, since the user configuration of the switching source edge router 20A is deleted, the switching destination edge router 20B relays the DHCP packet. As a result, the DHCP binding table of the switching destination edge router 20B is updated (Step S208) and the IP address is issued again. Here, when there are many user terminals 30, multicast re-acquisition requests may increase the load on edge routers and temporarily put pressure on an L2 (Layer 2) section.

As described above, in the maintenance and accommodation change in the related art, switching is triggered by an address re-acquisition request issued after the lease timer has expired. Thus, there is a problem that the communication interruption time is prolonged. In addition, there are problems such as an increased load on edge routers and pressure on the L2 section due to a large number of DHCP address re-acquisition request messages from a plurality of terminals.

Solution to Problem

In order to solve the above-described problems and to achieve the object, a communication control device according to the present invention includes: an acquisition unit configured to acquire information about switching of an edge router accommodating a user's terminal; an instruction unit configured to instruct a dynamic host configuration protocol (DHCP) server to induce re-acquisition of an internet protocol (IP) address by the terminal on the basis of the information about the switching acquired by the acquisition unit; and a receiving unit configured to receive, from the DHCP server, a notification that the induction of the re-acquisition is completed.

Also, a communication control method according to the present invention is a communication control method performed using a communication control device, which includes: an acquisition step of acquiring information about switching of an edge router accommodating a user's terminal; an instruction step of instructing a DHCP server to induce re-acquisition of an IP address using the terminal on the basis of the information about the switching acquired in the acquisition step; and a receiving step of receiving, from the DHCP server, a notification that the induction of the re-acquisition is completed.

Moreover, a communication control program according to the present invention causes a computer to execute: an acquisition step of acquiring information about switching of an edge router accommodating a user's terminal; an instruction step of instructing a DHCP server to induce re-acquisition of an IP address using the terminal on the basis of the information about the switching acquired in the acquisition step; and a receiving step of receiving, from the DHCP server, a notification that the induction of the re-acquisition is completed.

Advantageous Effects of Invention

According to the present invention, it is possible to further reduce a service impact on user communications in maintenance and accommodation change of edge routers in carrier networks.

DESCRIPTION OF EMBODIMENTS

Embodiments of an edge control device (communication control device as appropriate), an edge control method (communication control method as appropriate), and an edge control program (communication control program as appropriate) according to the present invention will be described below in detail on the basis of the drawings. Note that the present invention is not limited using embodiments which will be described later.

First Embodiment

A configuration of an edge control system, a configuration of an edge control device, a specific example of an address re-acquisition induction instruction method, and the overall flow of edge control processing according to a first embodiment (this embodiment as appropriate) will be described below in order, and finally, the effects of the embodiment will be described.

[Configuration of Edge Control System]

Figure 1:
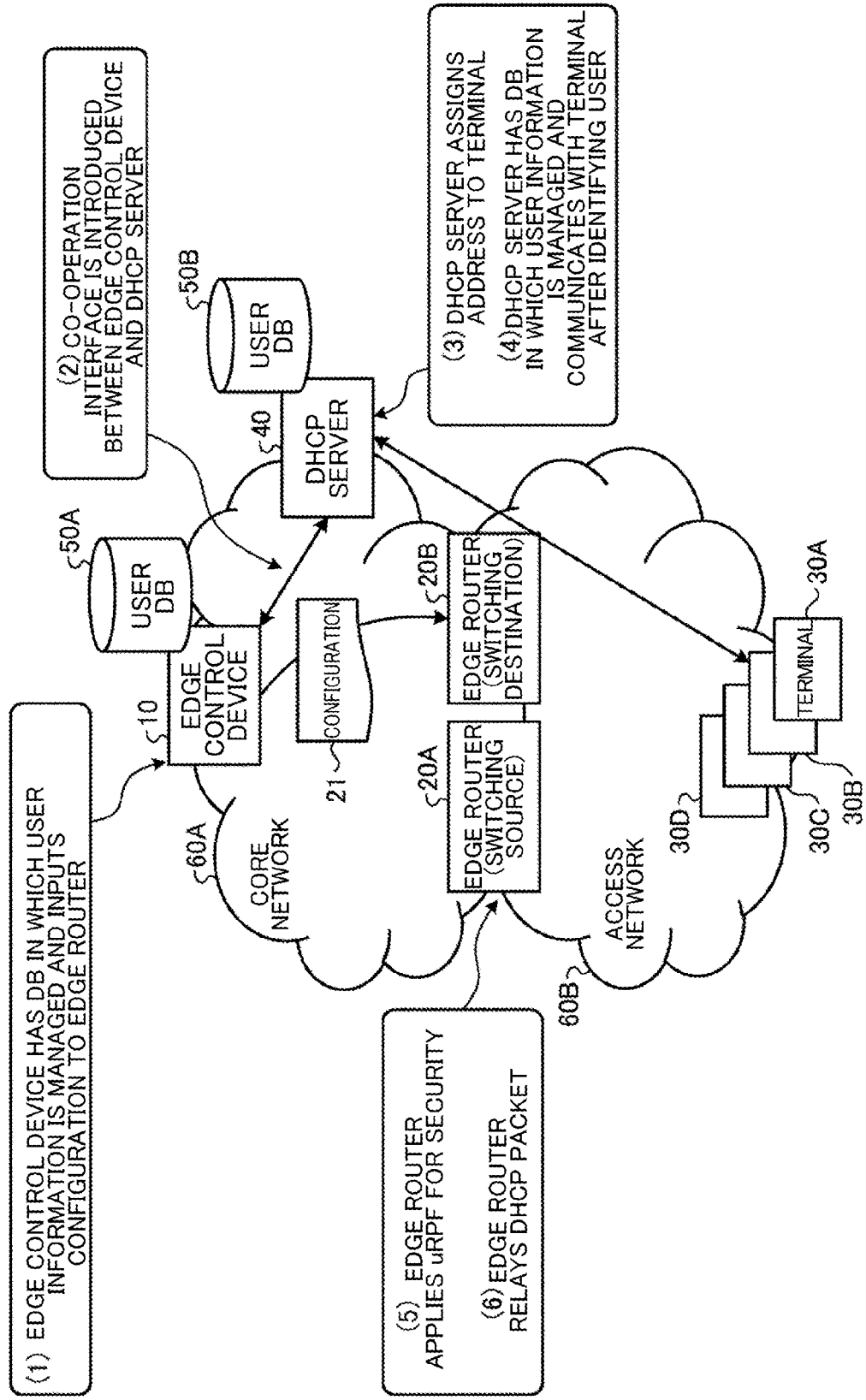
FIG. 1 is a diagram illustrating a configuration example of an edge control system according to a first embodiment.

A configuration of an edge control system (or this system as appropriate) 100 according to the embodiment will be described in detail using FIG. 1. FIG. 1 is a diagram illustrating a configuration example of an edge control system according to the first embodiment. This system 100 includes an edge control device 10, edge routers 20 (20A, 20B), user terminals 30 (30A, 30B, 30C, 30D), a DHCP server 40, user databases (DBs) 50 (50A, 50B), and a communication network 60 composed of a core network 60A and an access network 60B. Here, the edge control device 10, the edge router 20, the user terminal 30, the DHCP server 40, and the user DB 50 are communicatively connected by wire or wirelessly via the communication network 60 or a predetermined communication network (not shown). Note that the edge control system 100 illustrated in FIG. 1 may include a plurality of edge control devices 10 and a plurality of DHCP servers 40.

The edge control device 10 has a user DB 50A in which user information is managed and inputs a user configuration 21 to the edge router 20 (refer to FIG. 1(1)). Although the edge control device 10 inputs the user configuration 21 to the edge router 20B in FIG. 1, the user configuration 21 can also be input to the edge router 20A. A co-operation interface is introduced between the edge control device 10 and the DHCP server and the edge control device 10 and the DHCP server can mutually transmit and receive various information (refer to FIG. 1(2)).

The DHCP server 40 assigns an address to the user terminal 30 (refer to FIG. 1(3)). Furthermore, the DHCP server 40 also has a DB 40B in which user information is managed and communicates with the user terminal 30 after identifying the user (refer to FIG. 1(4)). Note that the DHCP server 40 refers to IP, DHCP option values and the like for user identification.

In the edge router 20, uRPF is applied for security (refer to FIG. 1(5)). Furthermore, the edge router 20 also relays a DHCP packet (refer to FIG. 1(6)). Note that each edge router belongs to the same broadcast domain. Detailed edge control processing by the edge control device 10 will be described later in [Overall Flow of Edge Control Processing].

In the edge control system 100 according to the embodiment, a co-operation interface is provided in the edge control device 10 which controls the edge router 20 and the DHCP server 40 so that the edge control device 10 can instruct the DHCP server 40 to induce address re-acquisition. The DHCP server 40 sends an address re-acquisition inducement message to the user terminal 30 on the basis of the instructions. For this reason, a switching procedure (sequence) of the edge router 20 capable of minimizing the interruption of user communication, including induction of address reacquisition to the user terminal 30 by co-operation between the edge control device 10 and the DHCP server 40, is proposed.

Also, the system 100 has a function which allows the edge control device 10 to set a user to be induced and a time interval of the instruction at the time of address re-acquisition induction instruction. For this reason, it is possible to reduce a bursty load due to the DHCP address re-acquisition message to the edge router 20 and the L2 section by limiting target users (for each device, for each link aggregation group (LAG), for each user) and by adjusting the message time interval.

[Configuration of Edge Control Device]

Figure 2:
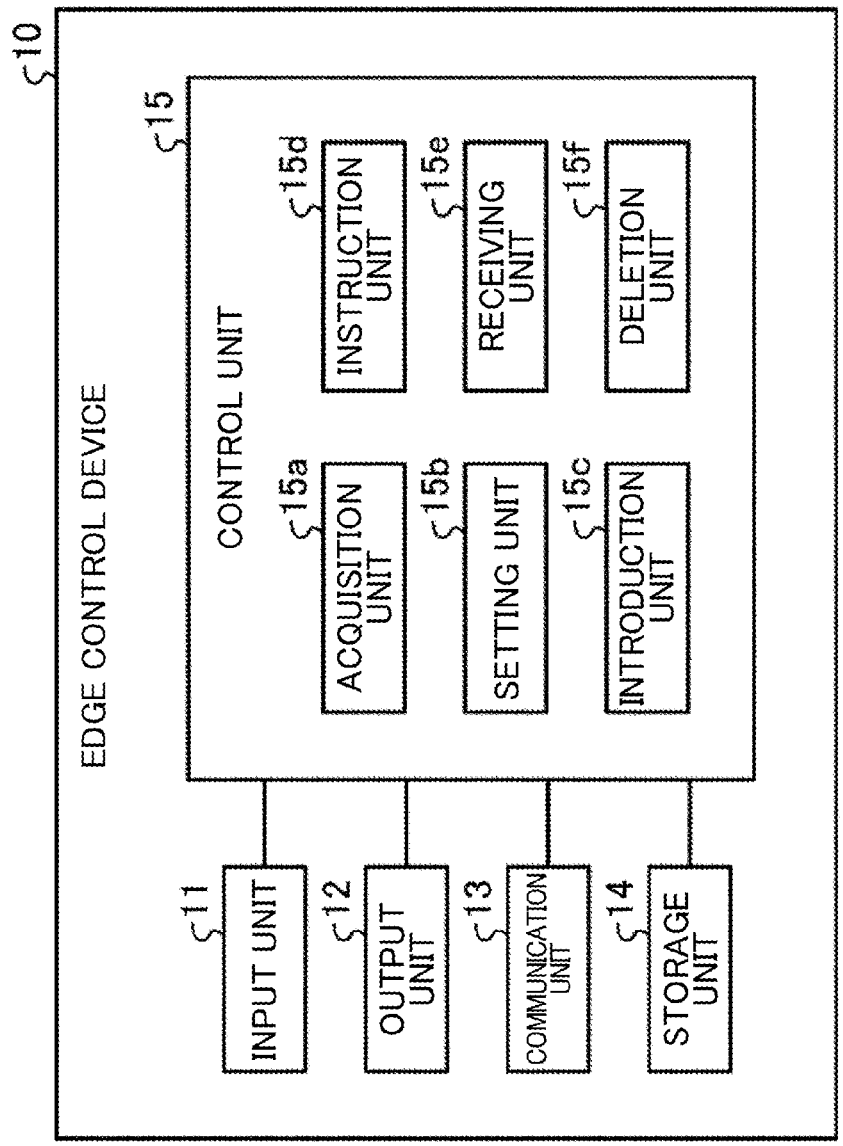
FIG. 2 is a block diagram illustrating a configuration example of an edge control device according to the first embodiment.

The configuration of the edge control device 10 according to the embodiment will be described in detail with reference to FIG. 2. FIG. 2 is a block diagram illustrating a configuration example of an edge control device according to the embodiment. The edge control device 10 has an input unit 11, an output unit 12, a communication unit 13, a storage unit 14, and a control unit 15.

The input unit 11 controls input of various information to the edge control device 10. The input unit 11 is, for example, a mouse, a keyboard, or the like and receives input of setting information or the like to the edge control device 10. Also, the output unit 12 controls output of various information from the edge control device 10. The output unit 12 is, for example, a display or the like and outputs setting information or the like stored in the edge control device 10.

The communication unit 13 performs data communication with other devices. For example, the communication unit 13 performs data communication with each communication device. Furthermore, the communication unit 13 can perform data communication with an operator's terminal (not shown).

The storage unit 14 stores various information used as references when the control unit 15 operates and various information acquired when the control unit 15 operates. Here, the storage unit 14 is, for example, a random access memory (RAM), a semiconductor memory device such as a flash memory, or a storage device such as a hard disk or an optical disk. Note that, although the storage unit 14 is installed inside the edge control device 10 in the example of FIG. 2, the storage unit 14 may be installed outside the edge control device 10 and a plurality of storage units may be installed.

The control unit 15 controls the edge control device 10 as a whole. The control unit 15 has an acquisition unit 15*a*, a setting unit 15*b*, an introduction unit 15*c*, an instruction unit 15*d*, a receiving unit 15*e*, and a deletion unit 15*f*. Here, the control unit 15 is, for example, an electronic circuit such as a central processing unit (CPU) or a micro processing unit (MPU) or an integrated circuit such as an application specific integrated circuit (ASIC) or a field programmable gate array (FPGA).

The acquisition unit 15*a* acquires information regarding switching of the edge router 20A in which the user's terminal 30 is accommodated. For example, the acquisition unit 15*a* acquires, as information about switching, information about the switching source edge router 20A, information about the user's terminal 30 to be accommodated, information of the switching destination edge router 20B, the purpose of edge router switching, the scheduled switching start time, the scheduled switching end time, and the like. On the other hand, the acquisition unit 15*a* may store the obtained information about switching in the storage unit 14.

The setting unit 15*b* sets the switching source edge router 20A to block a DHCP packet and cancel multicast communication when the acquisition unit 15*a* acquires information about switching. For example, for the purpose of edge router switching, the setting unit 15*b* sets the edge router 20A to block a DHCP packet and cancel multicast distribution when the information about the maintenance and accommodation change of the edge router 20A is acquired.

When the setting unit 15*b* sets blocking of a DHCP packet and cancellation of multicast communication, the introduction unit 15*c* inputs user setting information to the switching destination edge router 20B. For example, the introduction unit 15*c* inputs information about transfer settings of individual users such as IP address settings, VLANs, ACLs, or the like to the edge router 20B which is the switching destination for maintenance and accommodation change when the setting to block a DHCP packet and the setting to cancel multicast distribution are performed on the edge router 20A which is the switching source for maintenance and accommodation change.

The instruction unit 15*d* instructs the DHCP server 40 to induce re-acquisition of the IP address by the user's terminal 30 on the basis of the switching information acquired by the acquisition unit 15*a*. For example, the instruction unit 15*d* instructs the user's terminal 30 to induce re-acquisition of the IP address again in predetermined units at predetermined time intervals. Also, the instruction unit 15*d* also instructs the user's terminal 30 to induce re-acquisition of the IP address again for each device, LAG, or user. Note that the detailed address reacquisition induction instruction processing by the instruction unit 15*d* will be described later in [Address Re-acquisition Induction Instruction Method].

The receiving unit 15*e* receives, from the DHCP server 40, a notification that the user's terminal 30 has completed inducing the reacquisition of the IP address. For example, the receiving unit 15*e* receives a notification that induction of the re-acquisition sent by the DHCP server 40 to the edge control device 10 is completed when the DHCP server 40 sends a DHCPv6 reconfiguration to the user's terminal 30.

The deletion unit 15*f* deletes user setting information from the switching source edge router 20A when the receiving unit 15*e* receives a notification that induction of the re-acquisition of the IP address by the user's terminal 30 has completed. For example, the information relating to the forwarding settings of each user, such as the IP address setting of the user's terminal 30, VLAN, ACL, or the like, stored in the edge router 20A which is the source of switching for maintenance and accommodation change, is deleted.

[Address Re-acquisition Induction Instruction Method]

Figure 3:
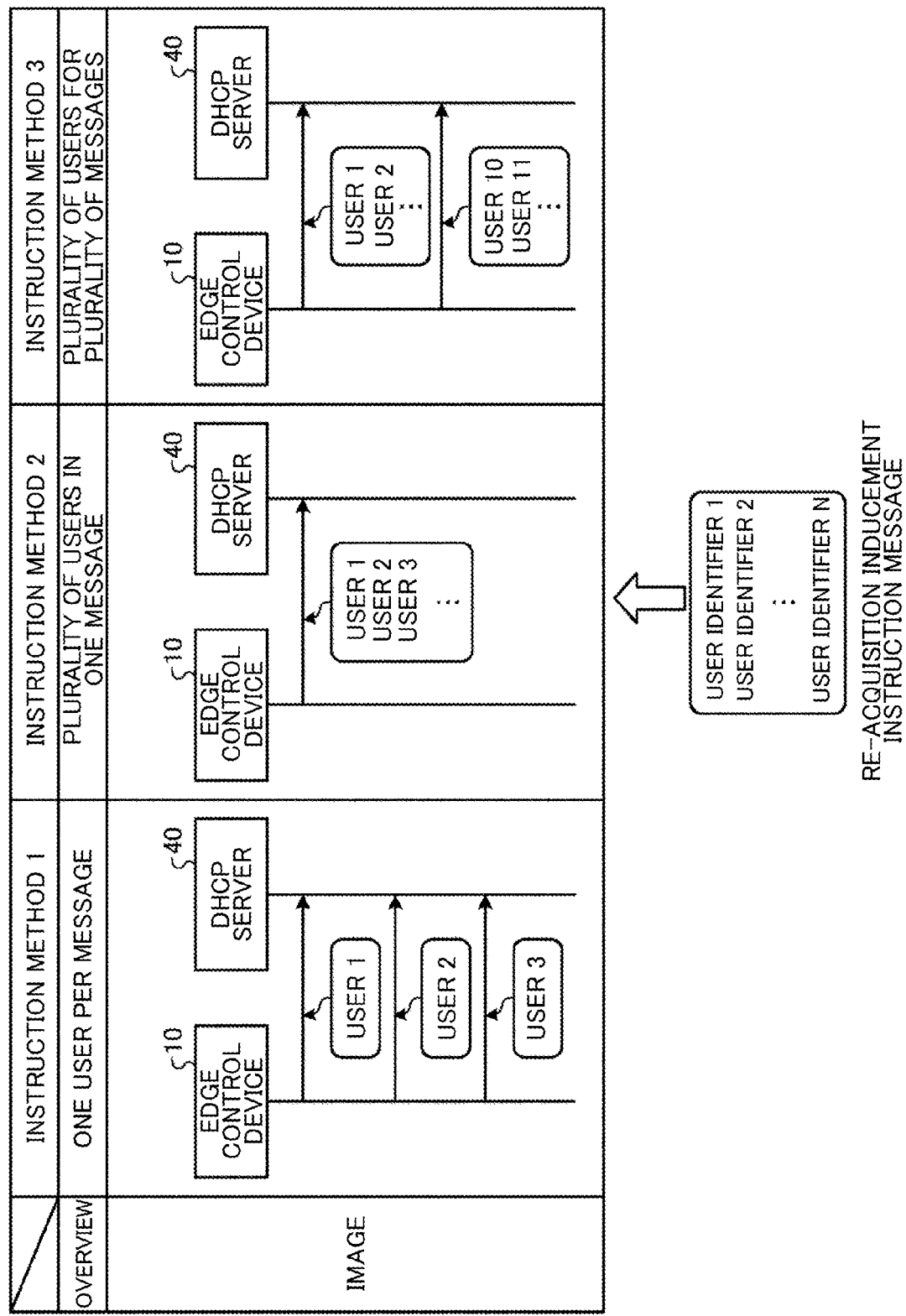
FIG. 3 is a diagram illustrating a specific example of an address re-acquisition induction instruction method according to the first embodiment.

The address re-acquisition induction instruction method according to the embodiment will be described in detail with reference to FIG. 3. FIG. 3 is a diagram illustrating a specific example of an address re-acquisition induction instruction method according to the first embodiment. Although Instruction Method 1, Instruction Method 2, and Instruction Method 3 are illustrated as address re-acquisition induction instruction methods in FIG. 3, the present invention is not particularly limited.

First, the instruction unit 15*d* of the edge control device 10 acquires user information relating to maintenance and accommodation change from the user DB 50A. At this time, the instruction unit 15*d* acquires user identifiers {User Identifier 1, User Identifier 2, . . . User Identifier N} corresponding to the number N of users as user information and generates a re-acquisition inducement instruction message on the basis of the user identifier through the following method. Note that the setting regarding the method of the reacquisition inducement instruction message generated by the instruction unit 15*d* can be changed statically or dynamically.

In Instruction Method 1, the instruction unit 15d transmits, to the DHCP server 40, an instruction message including one user per message. In Instruction Method 1 of FIG. 3, three instruction messages corresponding to User 1, User 2, and User 3 are transmitted. Note that the time interval for sending each message can be set arbitrarily (refer to Instruction Method 1 in FIG. 3). For example, the instruction unit 15d uses Instruction Method 1 to transmit an instruction message when targeting an individual user or when leveling the flow rate of re-acquisition packets in the L2 section.

In Instruction Method 2, the instruction unit 15d transmits, to the DHCP server 40, an instruction message including multiple users per message. In Instruction Method 2 in FIG. 3, one instruction message including all {User 1, User 2, User 3, . . . } is transmitted (refer to Instruction Method 2 in FIG. 3). For example, in order to reduce the load on the edge control device 10, the instruction unit 15d uses the instruction method 2 to transmit an instruction message when collectively instructing a plurality of target users.

In Instruction Method 3, the instruction unit 15d transmits, to the DHCP server 40, a plurality of instruction messages including a plurality of users. In Instruction Method 3 in FIG. 3, two instruction messages corresponding to {User 1, User 2, . . . } and {User 10, User 11, . . . } are transmitted. Note that the time interval for sending each message can be arbitrarily set (refer to Instruction Method 3 in FIG. 3). The instruction unit 15d transmits an instruction message using Instruction Method 3 when instructing for the purpose of compromising Instruction Method 1 and Instruction Method 2.

As described above, in the edge control system 100 according to the embodiment, the edge control device 10 has a function of specifying a target user in a re-acquisition induction instruction from the edge control device 10 to the DHCP server 40 and can send an instruction message in arbitrary user units and at time intervals. Furthermore, in this system 100, the opposite DHCP server 40 can induce a designated user to perform re-acquisition. In addition, the edge control device 10 can reduce bursty loads due to DHCP address re-acquisition messages to edge routers and L2 sections by limiting target users (for example, device unit, LAG unit, user unit) and adjusting the message time interval.

[Overall Flow of Edge Control Processing]

Figure 4:
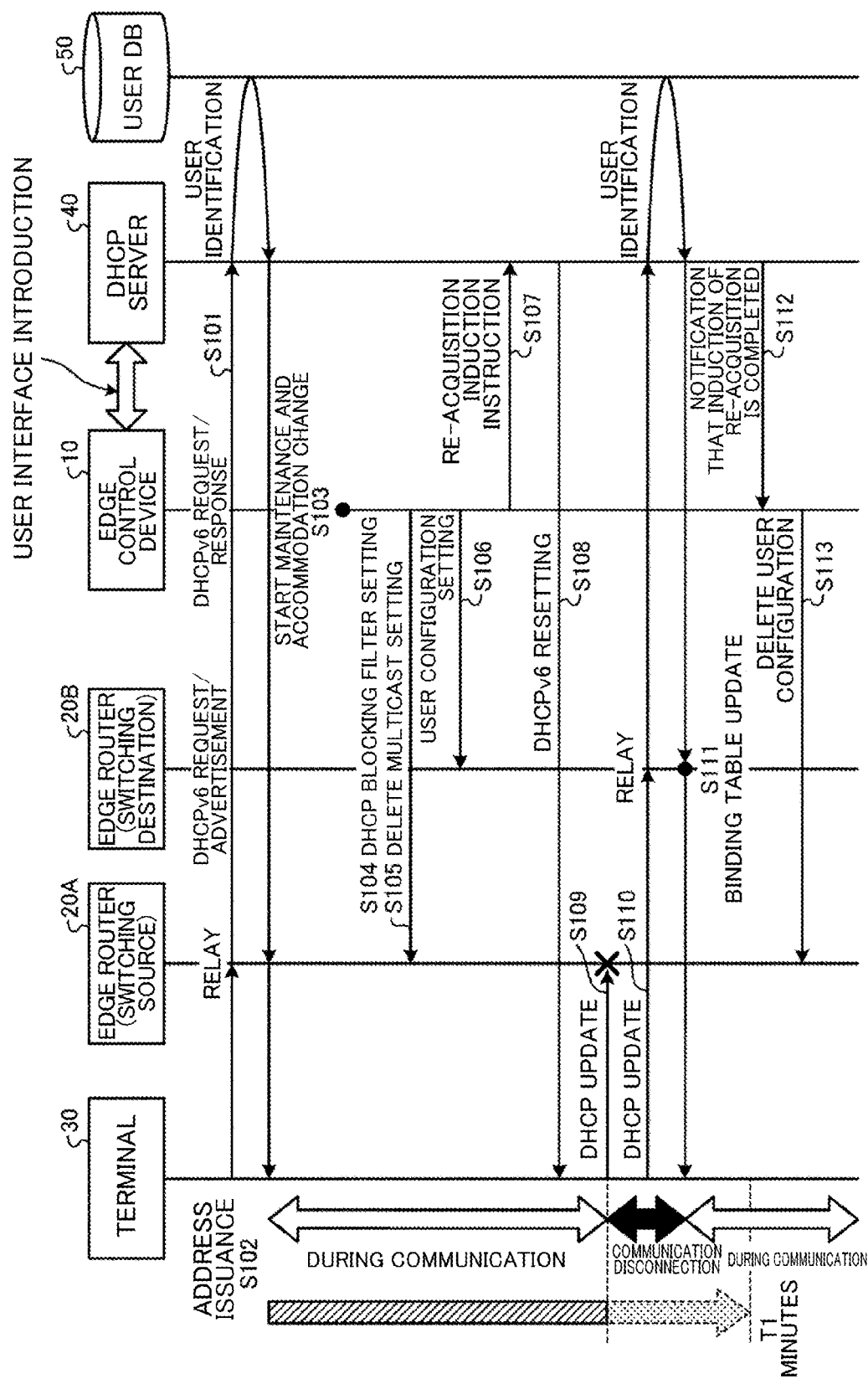
FIG. 4 is a sequence diagram illustrating an example of the overall flow of edge control processing according to the first embodiment.

The overall flow of edge control processing according to the embodiment will be described in detail with reference to FIG. 4. FIG. 4 is a sequence diagram illustrating an example of the overall flow of edge control processing according to the first embodiment. Here, a co-operation interface is introduced between the edge control device 10 and the DHCP server 40. The co-operation interface enables an address reacquisition induction instruction from the edge control device 10 to the DHCP server 40, enables address re-acquisition induction completion notification from the DHCP server 40 to the edge control device 10, and enables the edge control device 10 and the DHCP server 40 to mutually acquire lease timer information.

First, the user terminal 30 transmits a dynamic host configuration protocol version 6 (DHCPv6) request or a DHCPv6 request to the DHCP server 40 (Step S101). On the other hand, the DHCP server 40 transmits DHCPv6 advertisements and DHCPv6 responses to the user terminal 30 (Step S101). At this time, the switching source edge router 20A relays a DHCP packet between the user terminal 30 and the DHCP server 40. As a result, the IP address is issued from the DHCP server 40 to the user terminal 30 and the lease timer indicating the effective time of the address is activated (Step S102).

Subsequently, the acquisition unit 15a of the edge control device 10 acquires information about maintenance and accommodation change and starts maintenance and accommodation change (Step S103). The setting unit 15b of the edge control device 10 performs DHCP packet blocking settings (DHCP blocking filter settings) for the switching source edge router 20A (Step S104). Furthermore, the setting unit 15b performs the multicast communication cancellation setting (multicast setting deletion) for the switching source edge router 20A (Step S105).

In Steps S104 and S105, the setting unit 15b sets a filter which blocks a DHCP packet without deleting the user configuration and deletes multicast settings, thereby preventing DHCP relay and multicast distribution from the switching source edge router 20A. Note that the processes of Steps S104 and S105 may be performed simultaneously. Also, the process of Step S105 may be performed before the process of Step S104.

Subsequently, the introduction unit 15c of the edge control device 10 inputs user setting information (user configuration setting) to the switching destination edge router 20B (Step S106). At this time, there is no adverse effect even if the user configuration is input to multiple edge routers by blocking DHCP and deleting the multicast setting in advance.

For example, in the above processing, multiplex distribution of video and the like from a plurality of edge routers to the terminal does not cause pressure on the network band or unexpected operation on the terminal side.

Also, the instruction unit 15d of the edge control device 10 instructs the DHCP server 40 to induce re-acquisition of the IP address by the user's terminal 30 (re-acquisition inducement instruction) (Step S107). At this time, although the induction indicated by the instruction unit 15d is "FORCERENEW (RFC3203)" for DHCPv4 (Dynamic Host Configuration Protocol version 4) and "RECONFIGURE (RFC3315)" for DHCPv6, the present invention is not particularly limited.

On the other hand, the DHCP server 40 which has received the re-acquisition induction instruction transmits DHCPv6 reconfiguration to the user terminal 30 (Step S108). Furthermore, the user terminal 30 transmits a DHCPv6 update to the switching source edge router 20A to acquire the address again (step S109). At this time, the user terminal 30 ignores the lease timer expiration time and issues an address reacquisition request due to the re-acquisition induction of the DHCP server 40. Note that, since a DHCP blocking filter is set in the switching source edge router 20A, a temporary communication disconnection occurs.

Also, the user terminal 30 transmits a DHCPv6 update to the switching destination edge router 20B to reacquire the address (Step S110). At this time, since the switching source edge router 20A has a DHCP blocking filter set, the switching destination edge router 20B relays the DHCP packet. As a result, the DHCP binding table of the switching destination edge router 20B is updated (Step S111), the IP address is issued again and the temporary communication disconnection is resolved.

Finally, the receiving unit 15e of the edge control device 10 receives, from the DHCP server 40, a notification that induction of the re-acquisition of the IP address of the user's terminal 30 has completed (reacquisition induction completion notification) (Step S112). Furthermore, the deletion unit 15*f* of the edge control device 10 deletes the user setting information (deletes the user configuration) from the switching source edge router 20A (Step S113) and ends the process. At this time, the deletion unit 15*f* deletes the user configuration from the switching source edge router 20A after the user's accommodating destination edge router is switched, thereby minimizing the period of communication interruption.

As described above, in the edge control system 100 according to the embodiment, it is possible to minimize the service impact on the user in the maintenance and accommodation change by instructing the user terminal 30 to acquire an address again through co-operation between the edge control device 10 and the DHCP server 40. Also, when cooperation between the edge control device 10 and the DHCP server 40 makes it possible to induce DHCP address re-acquisition at any timing, it is possible to forcibly complete the accommodation change from the network side, ignoring the lease timer of the terminal.

Effects of First Embodiment

First, in the edge control processing according to the embodiment described above, information about switching of edge routers accommodating user terminals is acquired, the DHCP server is instructed to induce re-acquisition of the IP address by the user's terminal on the basis of the obtained edge router switching information, and a notification is received from the DHCP server that induction of re-acquisition is completed. Thus, in this processing, service impact on user communication can be further reduced in the maintenance and accommodation change of the edge router of the carrier network.

Second, in the edge control processing according to the embodiment described above, when information about switching of the edge router is acquired, the switch source edge router is set to block a DHCP packet and cancel multicast communication, when blocking a DHCP packet and canceling multicast communication are set, user setting information is input to the switching destination edge router, and when receiving a notification that the induction of re-acquisition of the IP address of the user's terminal has completed, the user setting information is deleted from the switching source edge router. Thus, in this processing, it is possible to reduce the occurrence of adverse effects on communications by edge routers and to further reduce service impacts on user communications in the maintenance and accommodation change of the edge router of the carrier network.

Third, in the edge control processing according to the embodiment described above, induction of the reacquisition of the IP address by the user's terminal is instructed at predetermined time intervals for each predetermined unit. Thus, in this processing, in the maintenance and accommodation change of the edge router of the carrier network, it is possible to reduce the increased burden on edge routers and pressure on the L2 section due to a large number of address re-acquisition requests and further reduce the service impact on user communications.

Fourth, in the edge control processing according to the embodiment described above, the user's terminal is instructed to induce IP address re-acquisition for each device, for each LAG, or for each user. Thus, in this processing, in the maintenance and accommodation change of the edge router of the carrier network, it is possible to more effectively reduce the increased load on edge routers and pressure on the L2 section due to a large number of address reacquisition requests, and further reduce the service impact on user communications.

[System Configuration and the Like]

Each component of each device shown in the drawings according to the above embodiment is functionally conceptual and necessarily need not to be physically configured as shown in the drawing. That is, the specific form of distribution and integration of each device is not limited to the one shown in the figure, and all or part of them can be functionally or physically distributed and integrated in arbitrary units according to various loads and usage conditions. In addition, each processing function performed by each device may be implemented in whole or in part by a CPU and a program analyzed and executed by the CPU, or implemented as hardware based on wired logic.

Also, among the processes described in the above embodiment, all or part of the processes described as being performed automatically may also be performed manually, or all or part of the processes described as being performed manually may be performed automatically by known methods. In addition, information including processing procedures, control procedures, specific names, and various data and parameters shown in the above documents and drawings can be arbitrarily changed unless otherwise specified.

[Program]

It is also possible to create a program in which the processing executed by the edge control device 10 described in the above embodiment is described in a computer-executable language. In this case, the same effects as those of the above embodiments can be obtained by having the computer execute the program. Furthermore, such a program may be recorded in a computer-readable recording medium, and the program recorded in this recording medium may be read by a computer and executed to realize processing similar to that of the above embodiments.

Figure 5:
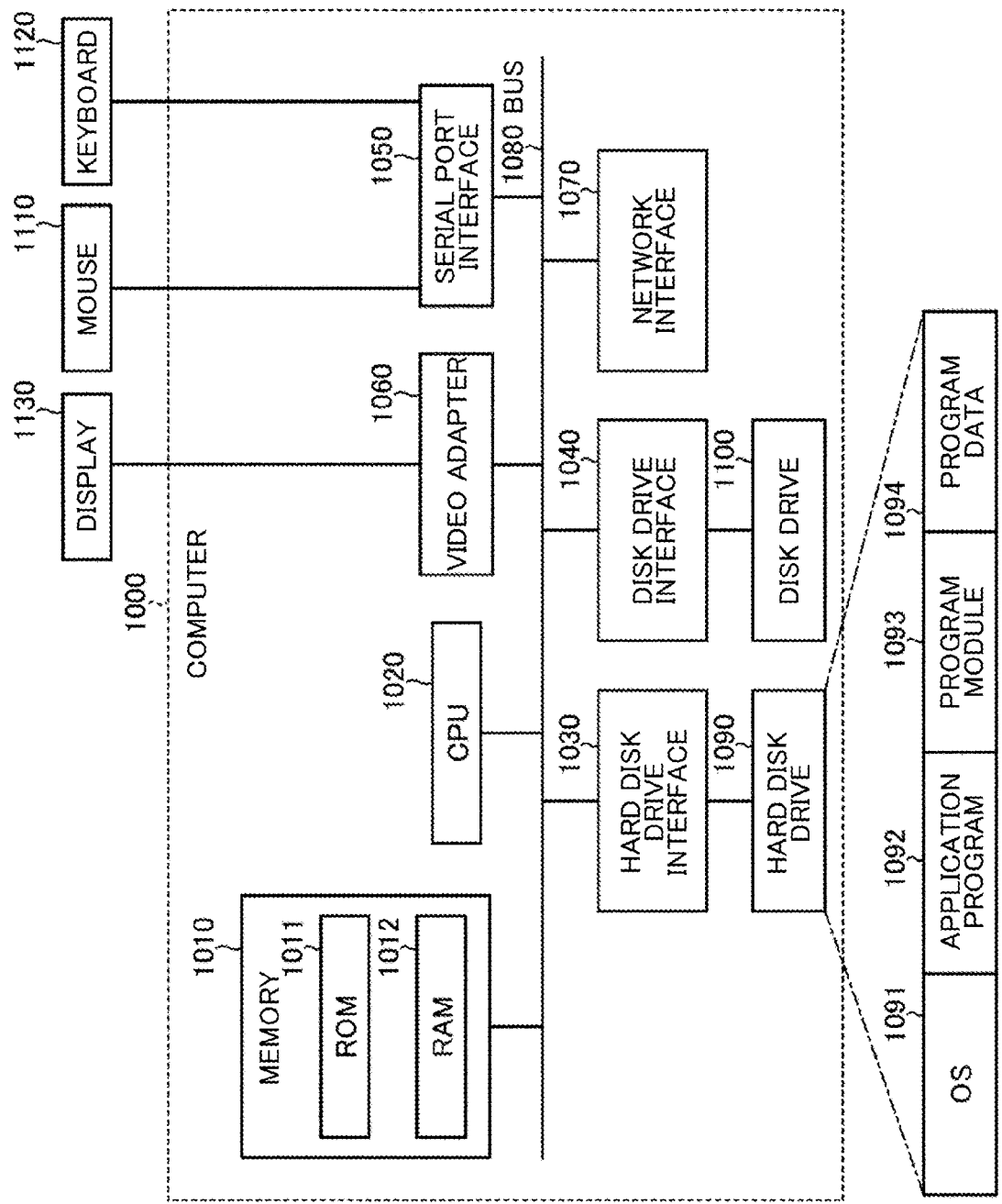
FIG. 5 is a diagram illustrating a computer which executes a program.
Figure 6:
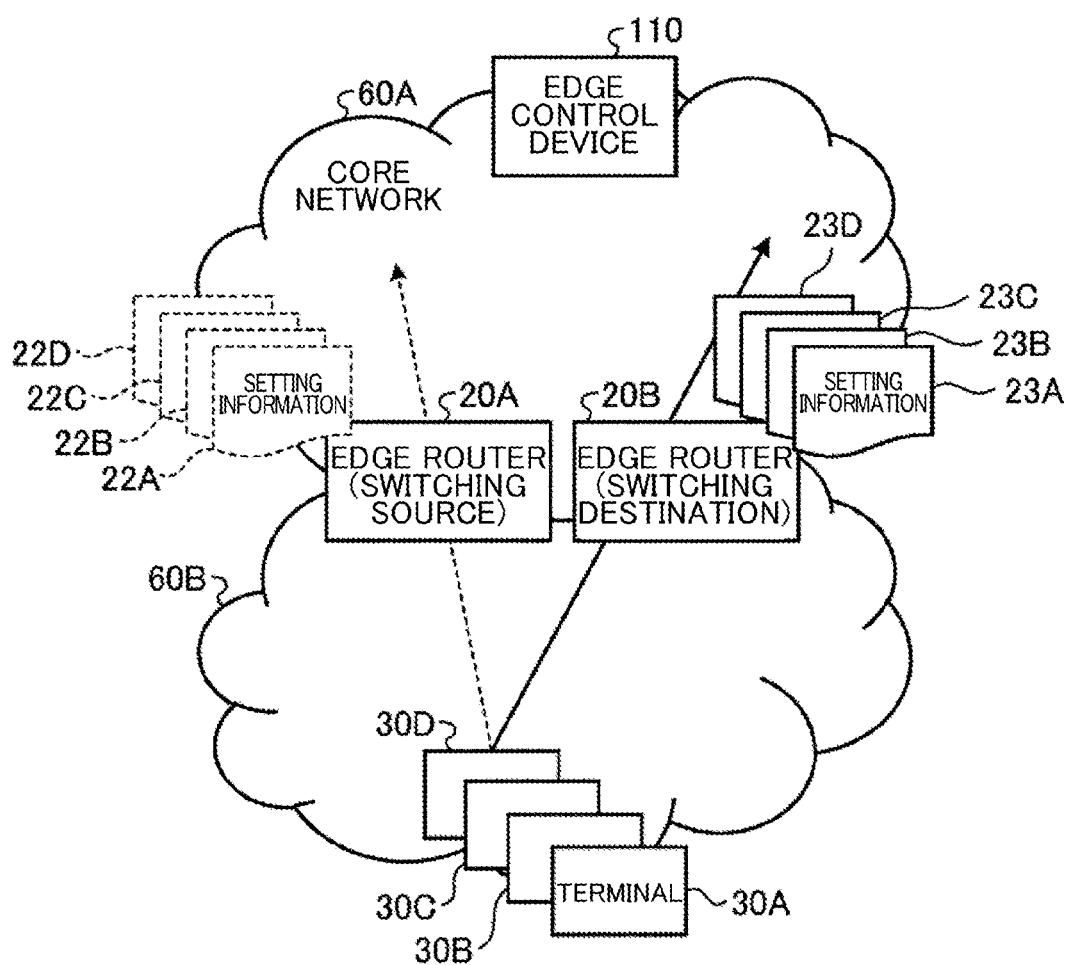
FIG. 6 is a diagram for explaining maintenance and accommodation change of an edge router in the related art.
Figure 7:
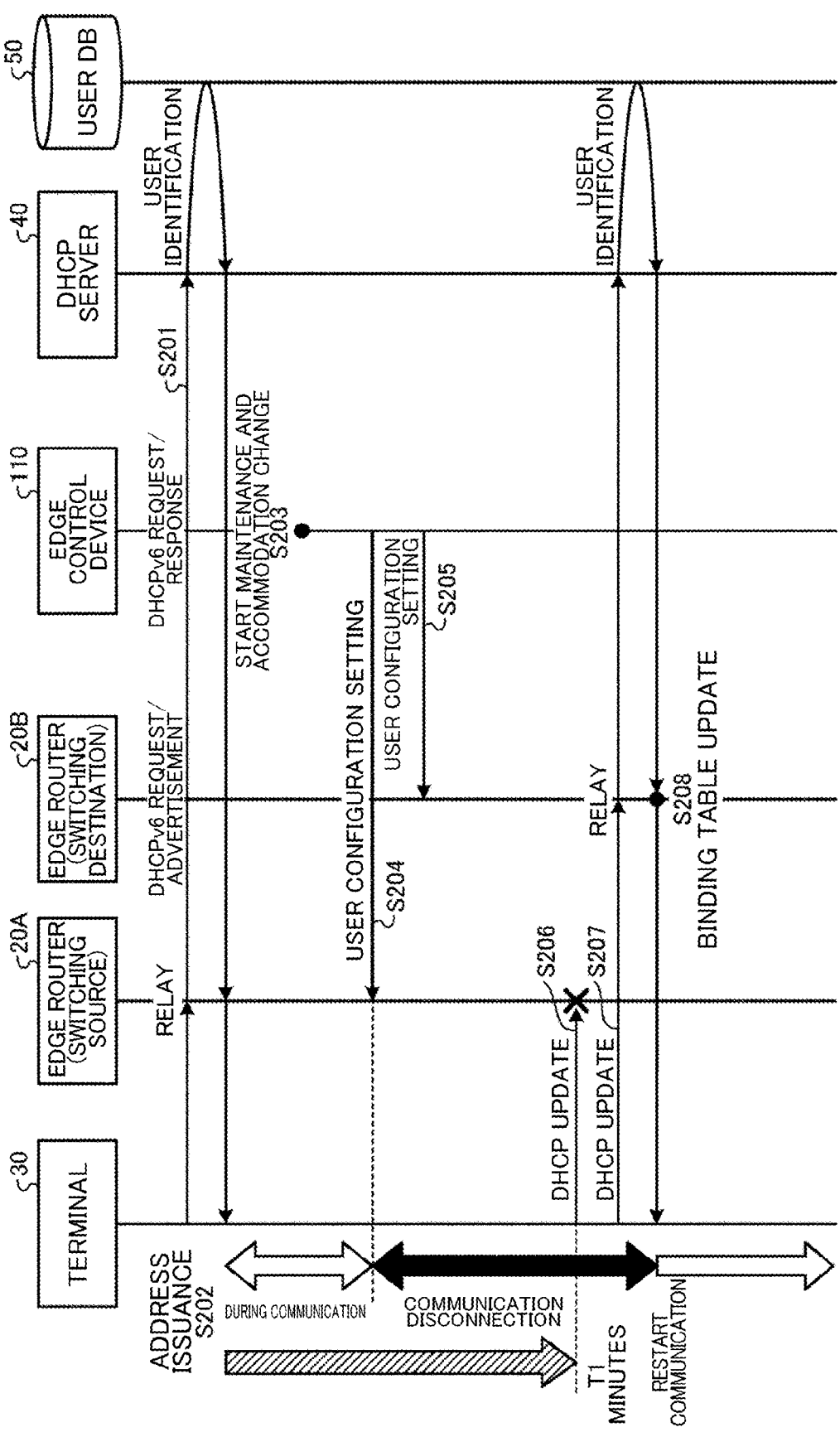
FIG. 7 is a sequence diagram for explaining maintenance and accommodation change of an edge router in the related art.

FIG. 5 is a diagram illustrating a computer that executes a program. As illustrated in FIG. 5, a computer 1000 includes, for example, a memory 1010, a CPU 1020, a hard disk drive interface 1030, a disk drive interface 1040, a serial port interface 1050, a video adapter 1060, and a network interface 1070, and these units are connected to each other via a bus 1080.

As illustrated in FIG. 5, the memory 1010 includes a read only memory (ROM) 1011 and a RAM 1012. The ROM 1011 stores, for example, a boot program such as a basic input output system (BIOS). As illustrated in FIG. 5, the hard disk drive interface 1030 is connected to a hard disk drive 1090. As illustrated in FIG. 5, the disk drive interface 1040 is connected to a disk drive 1100. For example, a removable storage medium such as a magnetic disk or an optical disc is inserted into the disk drive 1100. As illustrated in FIG. 5, the serial port interface 1050 is connected to, for example, a mouse 1110 and a keyboard 1120. As illustrated in FIG. 5, the video adapter 1060 is connected to, for example, a display 1130.

Here, as illustrated in FIG. 5, the hard disk drive 1090 stores, for example, an OS 1091, an application program 1092, a program module 1093, and program data 1094. That is, the program described above is stored in, for example, the hard disk drive 1090 as a program module describing instructions to be executed by computer 1000.

Also, various data described in the above embodiments are stored as program data in, for example, the memory 1010 or the hard disk drive 1090. In addition, the CPU 1020 reads the program module 1093 or the program data 1094 stored in the memory 1010 or the hard disk drive 1090 to the RAM 1012 as necessary and executes various processing procedures.

Note that the program module 1093 and the program data 1094 relating to the program are not limited to being stored in the hard disk drive 1090 and may be stored in, for example, a removable storage medium and read by CPU 1020 via a disk drive or the like. Alternatively, the program module 1093 and the program data 1094 relating to the program may be stored in another computer connected via a network (local area network (LAN), wide area network (WAN), or the like) and may be read by CPU 1020 via network interface 1070.

The above-described embodiments and modifications thereof are included in the scope of the invention described in the claims and their equivalents, as well as in the technology disclosed by the present application.

REFERENCE SIGNS LIST 10, 110 Edge control device (communication control device)
11 Input unit
12 Output unit
13 Communication unit
14 Storage unit
15 Control unit
15a Acquisition unit
15b Setting unit
15c Introduction unit
15d Instruction unit
15e Receiving unit
15f Deletion unit
20, 20A, 20B Edge router
21, 22, 22A, 22B, 22C, 22D, 23, 23A, 23B, 23C, 23D User
setting information (user configuration)
30, 30A, 30B, 30C, 30D User terminal
40 DHCP server
50, 50A, 50B User DB
60, 60A, 60B Communication network
100 Edge control system

The invention claimed is:

1. A communication control device, comprising one or more processors, configured to:
   acquire information about switching of an edge router accommodating a user's terminal;
   instruct a dynamic host configuration protocol (DHCP) server to induce re-acquisition of an internet protocol (IP) address by the terminal on the basis of the information about the acquired switching;
   receive, from the DHCP server, a notification that the induction of the re-acquisition is completed;
   set blocking of a DHCP packet and cancellation of multicast communication for a switching source edge router when acquiring the information about the switching;
   input setting information of the user to a switching destination edge router when setting the blocking of the DHCP packet and the cancellation of the multicast communication; and
   delete the setting information of the user from the switching source edge router when receiving the notification of the completion.

2. The communication control device according to claim 1, configured to instruct induction of the re-acquisition for each predetermined unit at predetermined time intervals.

3. The communication control device according to claim 2, configured to instruct the induction of the re-acquisition for each device, link aggregation group (LAG), or user.

4. A communication control method performed using a communication control device, comprising:
   acquiring information about switching of an edge router accommodating a user's terminal;
   instructing a DHCP server to induce re-acquisition of an IP address using the terminal on the basis of the information about the acquired switching;
   receiving, from the DHCP server, a notification that the induction of the re-acquisition is completed;
   setting blocking of a DHCP packet and cancellation of multicast communication for a switching source edge router when acquiring the information about the switching;
   inputting setting information of the user to a switching destination edge router when setting the blocking of the DHCP packet and the cancellation of the multicast communication; and
   deleting the setting information of the user from the switching source edge router when receiving the notification of the completion.

5. The communication control method according to claim 4, comprising: instructing induction of the re-acquisition for each predetermined unit at predetermined time intervals.

6. The communication control method according to claim 5, comprising: instructing the induction of the re-acquisition for each device, link aggregation group (LAG), or user.

7. A non-transitory computer readable medium storing one or more instructions causing a computer to execute:
   acquiring information about switching of an edge router accommodating a user's terminal;
   instructing a DHCP server to induce re-acquisition of an IP address using the terminal on the basis of the information about the acquired switching;
   receiving, from the DHCP server, a notification that the induction of the re-acquisition is completed;
   setting blocking of a DHCP packet and cancellation of multicast communication for a switching source edge router when acquiring the information about the switching;
   inputting setting information of the user to a switching destination edge router when setting the blocking of the DHCP packet and the cancellation of the multicast communication; and
   deleting the setting information of the user from the switching source edge router when receiving the notification of the completion.

8. The non-transitory computer readable medium according to claim 7, wherein the one or more instructions cause the computer to execute: instructing induction of the re-acquisition for each predetermined unit at predetermined time intervals.

9. The non-transitory computer readable medium according to claim 8, wherein the one or more instructions cause the computer to execute: instructing the induction of the re-acquisition for each device, link aggregation group (LAG), or user.

* * * * *